(12) United States Patent
Meyrahn et al.

(10) Patent No.: US 8,475,239 B2
(45) Date of Patent: Jul. 2, 2013

(54) METHOD FOR CONTROLLING A ROBOTIC DEVICE COOPERATING WITH DIFFERENT STORAGE FRAMES

(75) Inventors: Joachim Meyrahn, Erzhausen (DE); Frank Niedecker, Porza (CH)

(73) Assignee: Poly-clip Systems GmbH & Co. KG, Hattersheim (DE)

( * ) Notice: Subject to any disclaimer, the term of this patent is extended or adjusted under 35 U.S.C. 154(b) by 387 days.

(21) Appl. No.: 13/005,071

(22) Filed: Jan. 12, 2011

(65) Prior Publication Data
US 2011/0171003 A1 Jul. 14, 2011

(30) Foreign Application Priority Data
Jan. 12, 2010 (EP) .................................. 10000231

(51) Int. Cl.
*A22C 11/00* (2006.01)
(52) U.S. Cl.
USPC .......................................................... 452/51
(58) Field of Classification Search
USPC ............. 452/21–51; 198/419.3, 676.1, 678.1, 198/465.4; 99/477
See application file for complete search history.

(56) References Cited

U.S. PATENT DOCUMENTS

| | | | |
|---|---|---|---|
| 5,238,353 A * | 8/1993 | Kollross et al. | 414/746.4 |
| 6,374,984 B1 * | 4/2002 | Nagler | 198/382 |
| 6,779,647 B1 * | 8/2004 | Nagler | 198/395 |
| 7,007,595 B2 * | 3/2006 | Ozery et al. | 99/537 |
| 7,249,997 B2 * | 7/2007 | Kasai | 452/51 |
| 7,255,638 B2 | 8/2007 | Stimpfl | |

(Continued)

FOREIGN PATENT DOCUMENTS

| | | |
|---|---|---|
| DE | 20010268 U1 | 10/2000 |
| DE | 10252876 A1 | 6/2004 |

(Continued)

OTHER PUBLICATIONS

Abstract of DE 10252876 (A1) obtained from http://worldwide.espacenet.com on Oct. 11, 2011, 1 pg.

(Continued)

*Primary Examiner* — Richard Price, Jr.
(74) *Attorney, Agent, or Firm* — Hahn Loeser & Parks LLP; Bret A. Hrivnak, Esq.

(57) ABSTRACT

The present invention relates to a method for controlling a robotic device for inserting or removing rod-like elements into or from a storage frame, the rod-like elements, like smoking bars, serving for storing products, e.g. sausages, each having a sausage-shaped body and a loop for a pendulously storage of the products. The method comprises the steps of providing at least a first storage frame for temporarily storing rod-like elements, moving the storage frame into the operating range of the robotic device, picking up by the robotic device a rod-like element on which at least one sausage-like product is hung up, and inserting or removing the rod-like element into or from the storage frame by the robotic device. Moreover, the method comprises the steps of providing at least a first dataset including at least an information as to at least one geometric characteristic of the first storage frame, being used for controlling the robotic device, and by providing the first storage frame with a first identification mark for individually identifying the first storage frame and for providing a link between the first storage frame and the first dataset.

20 Claims, 2 Drawing Sheets

U.S. PATENT DOCUMENTS

| | | | |
|---|---|---|---|
| 7,563,067 B2 * | 7/2009 | Neutel | 414/751.1 |
| 7,614,942 B2 | 11/2009 | Liermann et al. | |
| 7,735,630 B2 * | 6/2010 | Borkiewicz et al. | 198/465.4 |
| 7,766,729 B2 | 8/2010 | Liermann et al. | |
| 8,151,973 B2 * | 4/2012 | Borkiewicz et al. | 198/465.4 |
| 8,366,522 B2 * | 2/2013 | Wally et al. | 452/32 |

FOREIGN PATENT DOCUMENTS

| | | |
|---|---|---|
| EP | 1985183 A1 | 10/2008 |
| EP | 1994829 B1 | 8/2009 |
| JP | 7023693 A | 1/1995 |

OTHER PUBLICATIONS

Abstract of EP 1994829 (Al) obtained from http://worldwide.espacenet.com on Oct. 11, 2011, 1 pg.

Machine Translation of DE 20010268 obtained from http://translationportal.epo.org on Oct. 12, 2011, 3 pgs.

Abstract of EP 1985183 (A1) obtained from http://worldwide.espacenet.com on Oct. 12, 2011, 1 pg.

Abstract of JP 7023693 obtained from http://www19.ipdl.inpit.go.jp on Oct. 12, 2011, 1 pg.

* cited by examiner

METHOD FOR CONTROLLING A ROBOTIC DEVICE COOPERATING WITH DIFFERENT STORAGE FRAMES

BACKGROUND OF THE INVENTION

The present invention relates to a method for controlling a robotic device according to the preamble of claim 1. In particular, the present invention relates to a method for controlling a robotic device for inserting or removing rod-like elements, like smoking bars, into or from a storage frame, the rod-like elements serving for storing sausage-like products, e.g. sausages, each having a sausage-shaped body and a loop on one end of the body for a pendulously storage of the products. The method comprises the steps of providing at least a first movable storage frame for temporary storing rod-like elements, moving the storage frame into the operating range of the robotic device, picking up by the robotic device a rod-like element on which at least one sausage-like product is hung up, and inserting or removing the rod-like element into or from the storage frame by the robotic device.

In an already known production line for producing sausage-like products, like sausages, a filling tube is provided for feeding a packing material or tubular casing, respectively, with, for example sausage meat, wherein the tubular casing is closed at one end facing in the filling direction by a first clip. After the filling operation is concluded, the tube-like casing is finally closed by a second clip. If the sausage is later to be hung up, for example for the purposes of smoking or storage, a suspension loop is fed thereto in such a way that, when the first or second clip is attached, it is embraced by the respective clip and is thus secured to the sausage. The term loops in accordance with this invention is used to denote all at least partially flexible means, by way of which articles can be hung up.

After the filling process, the sausage-like products can be subjected to further processing. In the case of sausages as the sausage-like products, this could be a smoking process for the purpose of which the sausages are brought into a smoking chamber. For this, the sausages have to be transported to the end of a conveyor and there taken over by an automatic hanging line, in which the sausages are hung up on a rod-like element, such as a smoking rod, at their loops one after another in such a way that, as far as possible, they do not touch each other. Afterwards, the smoking rods are transported to a storage frame which would have rollers for transporting the storage frame with the smoking rods into the smoking chamber. In this conjunction, a robotic device can be provided for removing the smoking rods from the storage frame and/or inserting the smoking rods into the storage frame.

A robotic device being part of an automatic sausage production line for inserting or removing rod-like elements into or from a storage frame is known from EP patent application 1 994 829.

In the production of sausage-like products using a production line, there can be a great variety of machines being components of the respective production line. Said machines may vary in their size, in the rate of production or in the size of products to be manufactured. Moreover, there can also be a variation as to the kind of used rod-like elements on which the sausage-like products are to be stored, and the kind of storage frames to which the rod-like elements are to be fed or from which they have to be removed. Even if identical rod-like elements are used, depending on the kind of sausage-like products and their further treatment, like smoking or boiling for sausages as sausage-like products, it might be necessary that the rod-like elements together with the sausage-like products hanging thereon, have to be placed at specific positions inside a storage frame. As already mentioned, there can also be used a great variety of storage frames, wherein these storage frames may be standardized with regard to their geometrical dimensions or may also be produced individually or a combination of both types of storage frames can be used.

Typical storage frames used in the manufacturing process for sausages can have a length of about 0.80 m to 1 m, a depth of about 1.00 m and a height of 1.20 m. The tray rails or shelf rails, respectively, which are arranged at opposite side walls of the storage frame and on which the rod-like elements in form of smoking bars are to be placed, may be formed by horizontally arranged profiles having a U-formed or square cross-section. The tray rails have often a predefined vertical distance in height to each other, which can be about 0.50 m, and also a predefined height to the bottom level. The storage frame can further comprise wheels or rollers or the like for moving the storage frame automatically or by hand.

Subject to the manufacturer of the storage frames, the storage frames may vary in size regarding the above-mentioned geometrical dimensions and/or in the diameter of the wheels used. Moreover, in use, storage frames may be damaged, individually adapted or repaired. Thus, the tray rails on which the rod-like elements are to be placed, may be modified and their position may be changed.

While inserting a rod-like element together with the sausage-like products hanging thereon into a storage frame, said rod-like element may butt against the storage frame since, for example, the size of said storage frame has been modified due to adaption, repair or damage. As a result thereof, the sausage-like products may fall off the smoking rod or may be destroyed. This can in particular happen, if a robotic device is used for inserting rod-like elements into or removing them from the storage frame, since a robotic device operates automatically based on a software program.

If a robotic device is used for storing the rod-like elements into or removing them from a storage frame, only one specific kind of storage frame is usable in conjunction with said robotic device in order to avoid the above described disadvantages. Moreover, to restore the exact dimensions of said storage frame by e.g. repairing, a damaged storage frame is very expensive.

BRIEF SUMMARY OF THE INVENTION

Therefore, it is an object of the invention to provide a method for controlling a robotic device for inserting rod-like elements into or removing them from a storage frame, with which the above mentioned drawbacks can be overcome and with which a correct insertion and removal of rod-like elements into or from storage frame free of damages is assured. In other words, a method for controlling a robotic device is sought which allows the use of different storage frames varying in at least one geometrical characteristic.

The aforesaid object is achieved by the features of claim 1. Advantageous configurations of the invention are described in claims 2 to 15.

In the present invention, the method for controlling a robotic device for inserting or removing rod-like elements, like smoking bars, into or from a storage frame, the rod-like elements serving for storing sausage-like products, e.g. sausages, each of which has a sausage-shaped body and a loop on one end of the body for a pendulously storage of the products, comprises the steps of providing at least a first movable storage frame for temporary storing rod-like elements, moving the storage frame into the operating range of the robotic device, picking up by the robotic device a rod-like element on which at least one sausage-like product is hung up, and inserting or removing the rod-like element into or from the storage frame by the robotic device. Moreover, the inventive method comprises the steps of providing at least a first dataset including at least an information as to at least one geometric characteristic of the first storage frame is provided, being used for controlling the robotic device, and providing the first storage frame with a first identification mark for individually identifying the first storage frame and for providing a link between the first storage frame and the first dataset.

In this configuration, the dataset including at least one geometric characteristic of the first storage frame may be exactly identified, called and provided with the robotic device for controlling the movement of the robotic device while inserting or removing rod-like elements into or from said first storage frame. Thus, the robotic device can be precisely controlled independently from the shape and/or size of the storage frame.

In an advantageous configuration, the first identification mark is used for several first storage frames having the same geometrical characteristics. In the case that the further first storage frames have the same geometrical characteristics, i.e. they are standardized storage frames, only one dataset has to be stored, called and provided with the robotic device, as long as said first storage frames are provided with said first identification mark.

According to a further advantageous configuration of the inventive method, at least a second dataset is provided including at least an information as to at least one geometric characteristic of a second storage frame, wherein the at least one geometric characteristic of the second dataset is different from the respective geometric characteristic of the at least first dataset, being used for controlling the robotic device, and wherein the at least second storage frame is provided with an at least second identification mark for individually identifying the at least second storage frame and for providing a link between the at least second storage frame and the at least second dataset.

By providing said at least a second dataset and said at least second identification mark which is different from the first identification mark, said at least second storage frame may be exactly identified, the respective dataset may be called and provided with the robotic device for controlling the movement of the robotic device while inserting or removing rod-like elements into or from said at least second storage frame.

It has to be understood, that the second dataset may be used not only for a single second storage frame, but also for several second storage frames having the same geometrical characteristics. Moreover, further datasets, e.g. third, fourth or fifth datasets and further identification marks, e.g. third, fourth or fifth identification marks each of which is different from each other, and provided with said further storage frames, e.g. the third, fourth or fifth storage frames may be provided to be linked to each other in the manner as described in conjunction with the first and second datasets, first and second identification marks and first and second storage frames.

Said at least first and/or second identification mark may be of different kind. In a preferred embodiment of the present invention, said at least first and/or second identification mark is a human readable label which can be formed by a colour of the storage frame, a letter or any other visible sing. In this case, an operator may check the information contained in said identification mark and can, for example, push a respective bottom for controlling the robotic device.

Said at least first and/or second identification mark may also be a machine readable label, for example a RFID tag or the like, whereby the information contained in said label may automatically be read and checked.

In a preferred embodiment of the present invention, said at least first identification mark is formed by not providing an identification mark. The robotic device or a control unit for controlling said robotic device may then be configured to use a predetermined dataset in the case that no identification mark is provided and thus, no link may be provided between an identification mark and a respective dataset. In this case, all storage frames having the same geometric characteristics may not be provided with an identification mark and form thus the first storage frames.

The link between the at least first and/or second identification mark and the respective dataset may be manually established, e.g. by an operator who manually calls a dataset according to the information contained in said label and provides said dataset to the robotic device or the respective control unit. It is also possible to automatically establish the link between the at least first and/or second identification mark and the respective dataset. In this case, mistakes by the operator while manually calling and providing a dataset to the robotic device may be omitted.

Advantageously, said at least first and/or second dataset is stored in a control unit for controlling the robotic device. Thereby, unnecessary data transfers and possible losses of data may be avoided. It may also be advantageous to store said at least first and/or second dataset in the identification mark of the respective storage frame. In this configuration, each dataset is directly coupled to the respective storage frame and may be read out to various robotic devices at various handling stations.

For a maximum utilization of the storage space provided by said storage frame, the at least first and/or second dataset contains information as to the position and number of rod-like elements and sausage-like products storable in the storage frame, for example, according to the size of the sausage-like products. Said additional information also allows a further handling of the charged storage frame, e.g. while further treatments of the sausage-like products.

To avoid erroneous charging and handling of said storage frames, the at least first and/or second datasets are updated in regular intervals. The update of the at least first and/or second dataset may be realized in various ways, e.g. by providing a new dataset varying in at least one parameter from a stored dataset, in the case that said at least one parameter of the storage frame has been changed, e.g. after a damage and a following repair has been occurred to said storage frame.

In the case that more than one parameter of the storage frame has been changed and the possible new dataset coincides with an existing dataset, it may be advantageous to change the link between the dataset and the identification mark such that the identification mark refers to the existing dataset. If the new dataset coincides with an existing dataset, it is also possible to provide the storage frame with a new identification mark. Said new identification mark should than be identical to the identification marks originally referring to the existing dataset.

It has to be understood, that all advantages described in conjunction with the first and second dataset, the first and second identification mark and the first and second storage frame apply to further datasets, identification marks and storage frames accordingly.

In the following, further advantages and embodiments of the inventive method are described in conjunction with the attached drawings. Thereby, the expression "left", "right", "below" and "above" are referred to the drawings in an orientation of the drawings which allows the normal reading of the reference numbers.

DETAILED DESCRIPTION OF THE INVENTION

Figure 1:
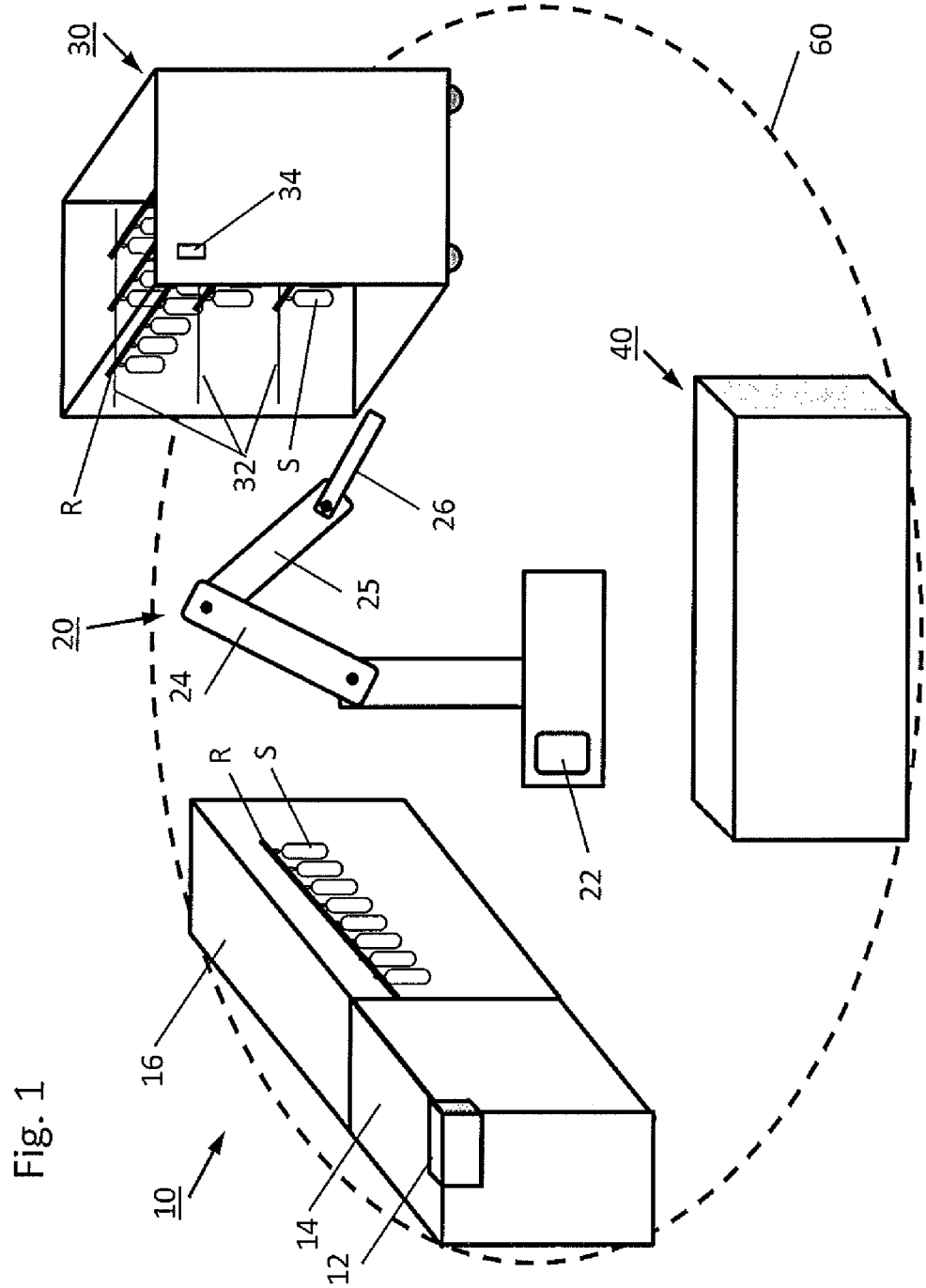
FIG. 1: is a schematically view of an exemplarily system for producing and handling sausage-like products including a robotic device, for executing the method according to the present invention.

The exemplarily system for producing and handling sausage-like products, according to FIG. 1, comprises as main components a schematically shown production unit 10 for producing sausage-like products S, like sausages, and storing them on rod-like elements R, like smoking rods, including a control unit 12 for controlling the production unit 10, a robotic device 20 having a control unit 22 for controlling the movement of robotic device 20, and a storage frame 30, into which the sausages S hung up at the smoking rods R are to be moved. As shown in FIG. 1, the system for producing and handling the sausages S further comprises a treatment station 40, in which any possible treatment to the sausages S can be executed before they are stored in storage frame 30. A possible treatment may be splashing the sausages S with a smoking fluid or a flavoring fluid. Alternatively, additional treatment stations may belong to the system. If no treatment is necessary to the sausages S between production and storage in storage frame 30, no treatment station needs to be integrated into the system.

Storage frame 30 is positioned in an operating range of robotic device 20 which is illustrated by broken lined circle 60. Inside storage frame 30, tray rails or shelf rails 32 e.g. in the form of horizontally aligned bars are arranged for positioning smoking rods R thereon. An identification mark 34 is attached at an outside surface of storage frame 30.

Robotic device 20, which, according to FIG. 1, is a so called joined-arm robot, is positioned in the centre of its operating range 60 to reach all units 10, 30, 40 and stations peripherally arranged inside operating range 60 by its pivotally attached arms 24, 25. At front end of arm 25, a gripping unit 26 is arranged for gripping the smoking rods R with the sausages S hanging thereon inside production unit 10 and moving it to storage frame 30 and/or for placing empty smoking rods R removed from an empty storage frame 30 in the production unit 10.

Production unit 10 for producing sausages S comprises a sausage production device 14 and an automatic hanging line 16. At least automatic hanging line 16 is peripherally arranged inside operating range 60. In production unit 10, sausages are produced in a known manner by e.g. filling sausage meat through a filling pipe into a tubular casing and closing the casing by a clipping machine attaching and closing clips at both ends. Thereby, a flexible suspension loop is fed to one of the closing clips to be attached together with said clip to the respective end of the sausages S. Thereafter, sausages S will be placed in regular intervals at smoking rod R in automatic hanging line 16.

Figure 2:
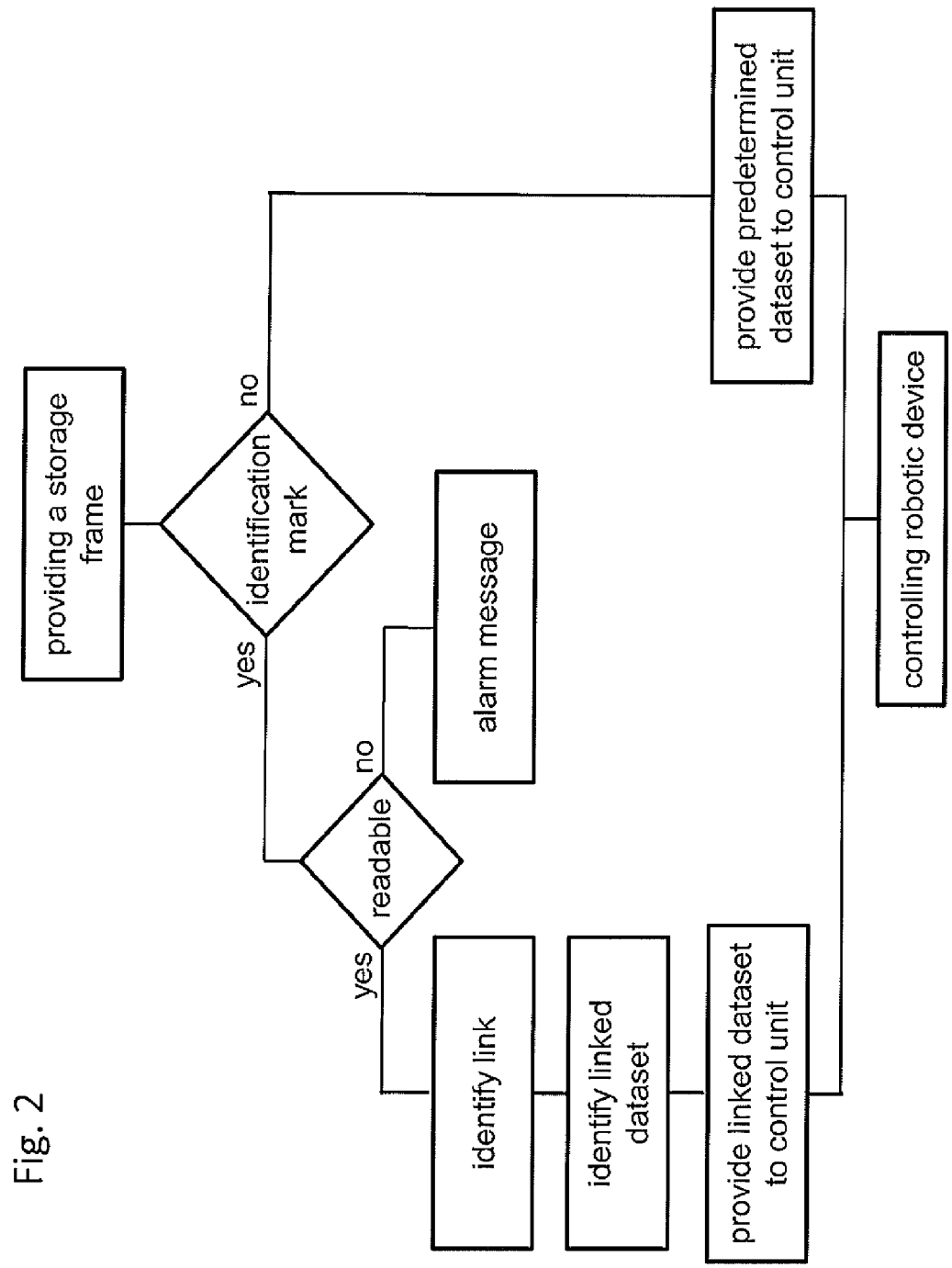
FIG. 2: is a schematically diagram of the method for controlling a robotic device according to the present invention.

In FIG. 2, a schematically diagram or flow chart of one embodiment of the method according to the present invention is shown. In a first step, a storage frame 30 is provided. That means that the empty storage frame 30 is moved into the operating range 60 of robotic device 20. In the next step, the question, if an identification mark 34 is available with storage frame 30, has to be answered.

If the answer is "no", a predetermined dataset is called and transmitted to the control unit 22 of the robotic device 20 for controlling the movement of the robotic device 20 while gripping smoking rod R with the sausages S hanging thereon inside production unit 10, moving it to and inserting it into storage frame 30.

If the answer is "yes", identification mark 34 has to be checked, whether information stored on identification mark 34 is readable or not. If said information is not readable, an alarm message is put out e.g. by a reading device for reading out said information or by an operator, who is controlling the data readout or who manually reads out said data. If said data are readable, a link may be identified and the respective dataset, to which said link referres, is identified by identification mark 34. The identified dataset is than provided to control unit 22 of robotic device 20, which is, in turn, controlled by said dataset.

The dataset called in the case that no identification mark 34 is provided with storage frame 30, should be a standard dataset for several storage frames 30 having identical geometric characteristics. By using several storage frames 30 having identical geometric characteristics, it is not necessary to provide a link to a dataset to be used or to read out data from an identification mark 34 each time one of said several storage frames 30 is moved into operating range 60 of robotic device 20. Said "standard" dataset should be stored in control unit 22 of robotic device 20 to be available to robotic device 20.

Also, individual datasets may be stored in control unit 22 of robotic device 20 to be linked with respective individual storage frames 30 via individual identification marks 34 provided with said individual storage frames 30.

Additionally, further standard datasets linked to further several storage frames 30 having identical geometric characteristics may be provided for controlling robotic device 20. In this case, said storage frames 30 having identical geometric characteristics may be provided with identical identification marks 34.

Said identification marks may be of different kind. In a simple case, an identification mark is a label carrying a number which refers to a respective dataset. Said number may manually be inputted into control unit 22 for calling the respective dataset. In a further simple case, it is possible to provide a colored label with the storage frame 30 or a colored portion on storage frame 30. The link to the respective dataset is than established by electing the dataset referred by the respective color.

The dataset should contain not only one geometric characteristic of storage frame 30, but all geometrical characteristic necessary for controlling exactly the movement of robotic device 20 while charging storage frame 30 with rod-like elements. Said further geometrical characteristics may be the vertical height of at least one tray or shelf 32 of the storage frame or the vertical distance between the tray rails or shelf 32 rails, respectively, of the storage frame and/or the horizontal distance between adjacent delivery positions of the rod-like elements R on a tray 32 and so on.

As already described above, identification mark 34 may be a label which contains information. Said label may be machine readable or human readable. In case of a machine readable label said label may be an RFID-label, but said label may also be of any other kind of machine readable label as barcodes, smart labels, chip card, tags or any other suitable electronic or optical technology. In case that said identification mark 34 or label is a human readable label, said label may contain any sign, e.g. digits or characters, to be read and able to provide a link to a dataset. It has to be noted that it is also possible to have identification marks being machine and human readable, for example, coloured RFID tags wherein different colours and different electronic data stored in the RFID tag are used for differing the first and second identification mark.

In the further case that no identification mark 34 is provided with storage frame 30, a predetermined dataset is called and transmitted to the control unit 22 of the robotic device 20 for controlling the movement of the robotic device 20. It may also be scheduled to call said predetermined dataset if an empty or blank identification mark 34 is provided with storage frame 30.

According to the method described in conjunction with FIG. 2, the datasets are stored in control unit 22 of robotic device 20. It is also possible, that the dataset for a respective storage frame 30 is stored in identification mark 34. In this case, identification mark 34 is provided with a memory portion containing said dataset. Moreover, the link between storage frame 30 and the respective dataset, in this case, is provided by storing the dataset in identification mark 34 and attaching said identification mark 34 to storage frame 30.

All datasets, irrespective of the place where they are stored, should be updated in regular intervals to avoid robotic device 20 to damage storage frame 30 while charging. In case that a single geometrical parameter of storage frame has been changed, it is possible to amend said parameter in the respective dataset. Otherwise, if more than one geometrical parameter of storage frame 30 has been changed, a new dataset may be provided and linked by the respective identification mark 34.

In the special case that the geometrical characteristics of storage frame 30 have been changed in a manner that they coincide with an existing dataset, the link provided by identification mark 34 may be changed to refer to the coincident dataset or to exchange identification mark 34 to an identification mark already referring to said coincident dataset.

The invention claimed is:

1. A method for controlling a robotic device for inserting or removing rod-like elements, into or from a storage frame, the rod-like elements serving for storing sausage-like products, each of which has a sausage-shaped body and a loop on one end of the body for a pendulously storage of the sausage-like products, the method comprising the steps of:
providing at least a first movable storage frame for temporarily storing the rod-like elements,
moving the storage frame into the operating range of the robotic device,
picking up a rod-like element on which at least one sausage-like product is hung up by the robotic device,
inserting or removing the rod-like element into or from the storage frame by the robotic device, and
providing at least a first dataset including at least an information as to at least one geometric characteristic of the first storage frame, the dataset being used for controlling the robotic device,
wherein the first storage frame is provided with a first identification mark for individually identifying the first storage frame and for providing a link between the first storage frame and the first dataset.

2. The method according to claim 1,
wherein the first identification mark is used for several first storage frames having the same geometrical characteristics.

3. The method according to claim 2,
wherein at least a second dataset is provided including at least an information as to at least one geometric characteristic of a second storage frame, wherein the at least one geometric characteristic of the second dataset is different from the respective geometric characteristic of the at least first dataset, being used for controlling the robotic device, and wherein the at least second storage frame is provided with an at least second identification mark for individually identifying the at least second storage frame and for providing a link between the at least second storage frame and the at least second dataset.

4. The method according to claim 3,
wherein said at least first and/or second identification mark is a human readable label.

5. The method according to claim 3,
wherein said at least first and/or second identification mark is a machine readable label.

6. The method according to claim 5,
wherein the link between the at least first and/or second identification mark and the respective dataset is manually established.

7. The method according to claim 5,
wherein the link between the at least first and/or second identification mark and the respective dataset is automatically established.

8. The method according to claim 3,
wherein said at least first and/or second dataset is stored in a control unit for controlling the robotic device.

9. The method according to claim 8,
wherein said at least first and/or second dataset is stored in the first and/or second identification mark of a respective storage frame.

10. The method according to claim 3,
wherein the at least first and/or second dataset contains information as to the position and number of rod-like elements and sausage-like products storable in the storage frame.

11. The method according to claim 3,
wherein the at least first and/or second datasets are updated in regular intervals.

12. The method according to claim 11,
wherein the update of the at least first and/or second dataset is realized by providing a new dataset varying in at least one parameter from a stored dataset.

13. The method according to claim 11,
wherein the update of the at least first and/or second dataset is realized by changing the link between the dataset and the identification mark.

14. The method according to claim 11,
wherein the update of the at least first and/or second dataset is realized by providing the storage frame with a new identification mark.

15. The method according to claim 1,
wherein at least a second dataset is provided including at least an information as to at least one geometric characteristic of a second storage frame, wherein the at least one geometric characteristic of the second dataset is different from the respective geometric characteristic of the at least first dataset, being used for controlling the robotic device, and wherein the at least second storage frame is provided with an at least second identification mark for individually identifying the at least second storage frame and for providing a link between the at least second storage frame and the at least second dataset.

16. The method according to claim 15,
wherein said at least first and/or second dataset is stored in a control unit for controlling the robotic device.

17. The method according to claim 16,
wherein said at least first and/or second dataset is stored in the first and/or second identification mark of a respective storage frame.

18. The method according to claim 15,
wherein the at least first and/or second dataset contains information as to the position and number of rod-like elements and sausage-like products storable in the storage frame.

19. A method for controlling a robotic device for inserting or removing rod-like elements, into or from a storage frame, the rod-like elements serving for storing sausage-like products, each of which has a sausage-shaped body and a loop on one end of the body for a pendulously storage of the sausage-like products,
the method comprising the steps of:
providing at least a first movable storage frame for temporarily storing the rod-like elements,
moving the storage frame into the operating range of the robotic device,
picking up a rod-like element on which at least one sausage-like product is hung up by the robotic device,
inserting or removing the rod-like element into or from the storage frame by the robotic device, and
providing at least a first dataset including at least an information as to at least one geometric characteristic of the first storage frame, the dataset being used for controlling the robotic device,
wherein the first storage frame is provided with a means for individually identifying the first storage frame and for providing a link between the first storage frame and the first dataset.

20. The method according to claim 19,
wherein at least a second dataset is provided including at least an information as to at least one geometric characteristic of a second storage frame, wherein the at least one geometric characteristic of the second dataset is different from the respective geometric characteristic of the at least first dataset, being used for controlling the robotic device, and wherein the at least second storage frame is provided with a means for individually identifying the at least second storage frame and for providing a link between the at least second storage frame and the at least second dataset,
and wherein the means for individually identifying the first storage frame is the absence of a first identification mark.

* * * * *